Figures 1, 2:
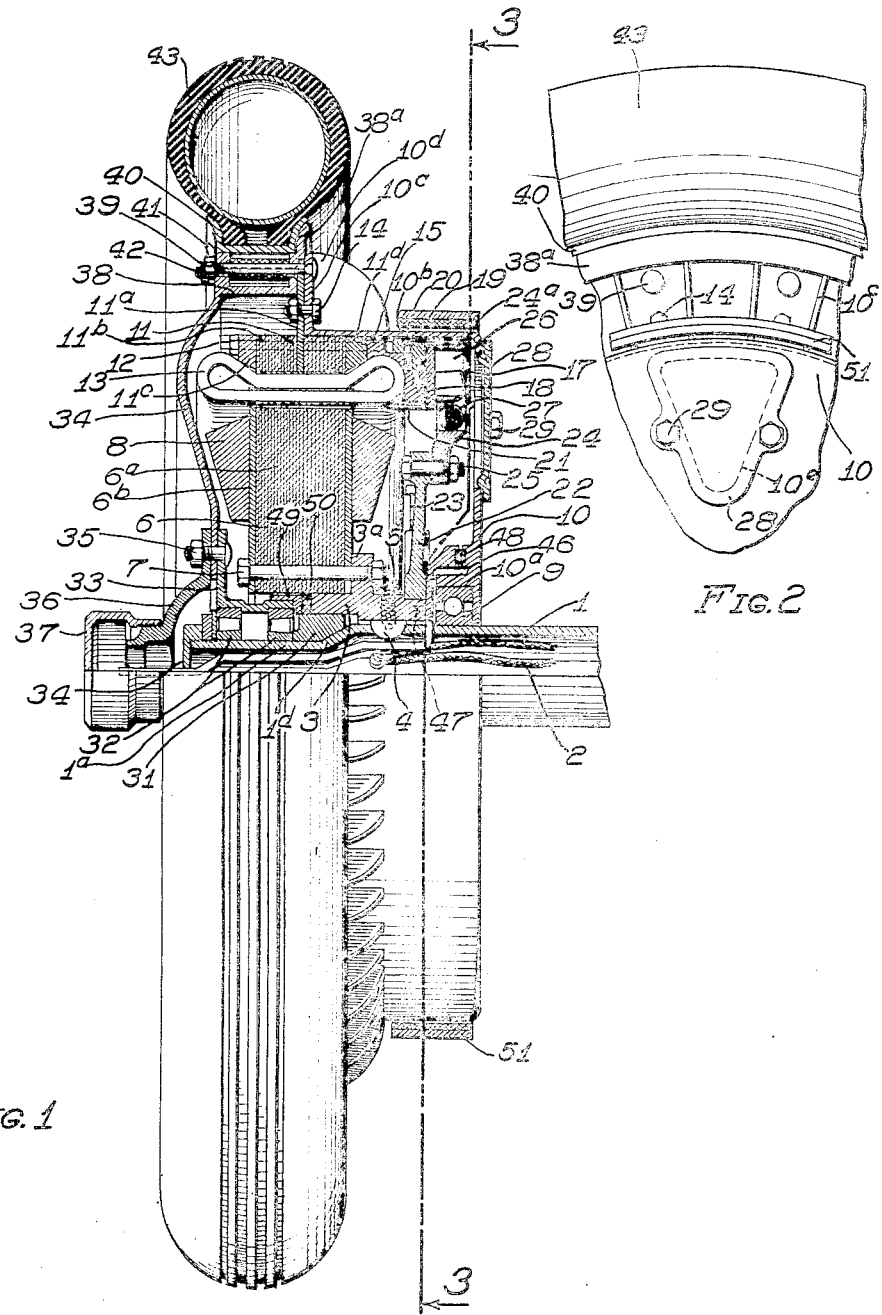

Feb. 18, 1930.  E. W. WEATHERS  1,747,560
VEHICLE WHEEL
Filed Nov. 2, 1926  2 Sheets-Sheet 1

INVENTOR.
EATHELBERT W. WEATHERS
BY A.B.Bowman
ATTORNEY

Patented Feb. 18, 1930

1,747,560

UNITED STATES PATENT OFFICE

EATHELBERT W. WEATHERS, OF SAN DIEGO, CALIFORNIA

VEHICLE WHEEL

Application filed November 2, 1926. Serial No. 145,722.

My invention relates to a vehicle wheel, and more particularly to wheels having electric power units forming a part of the wheel.

The objects of my invention are: first, to provide a vehicle wheel of this class which is particularly adapted for automobiles or similar vehicles, and which includes an electric motor drive and still includes the desirable features of conventional vehicles with respect to demountability and accessibility; second, to provide a vehicle wheel of this class in which the field core is stationary on the axle and in which the armature rotates with the wheel around the field core, thus providing a relatively compact electric motor-driven vehicle wheel; third, to provide a vehicle wheel mechanism having a stationary, hollow housing for carrying a stationary field and on which is revolubly mounted the revoluble portions of the wheel, the hollow axle serving as a casing or enclosure for the electrical conductors to the wheel; fourth, to provide a vehicle wheel mechanism of this class in which the hollow axle is provided with a cap at its outer end to exclude grease and the like therefrom, said cap being removable to provide access to the conductors within the axle; fifth, to provide a vehicle wheel of this class in which the housing enclosing a portion of the motor serves also as an external brake means; sixth, to provide a vehicle wheel of this class in which the outer portion of the housing of the wheel is substantially flush and may even be positioned inwardly from the outer side or end plane of the tire so as to reduce to a minimum the danger of injuring the housing and the interior of the motor part; seventh, to provide a wheel of this class in which the hub member, which may be readily removed to permit access to the outer bearing means and to the interior of the axle, is separated to as great an extent as possible to reduce damage to the axle and other parts as much as possible in case of collision; eighth, to provide a wheel of this class in which the wheel disc and tire rim carrier, as well as the tire, may be removed as a unit, if desired, without removing the remaining portion of the wheel; ninth, to provide a wheel of this class in which the brushes are mounted at the inner portion of the wheel within the innermost housing so that the armature and commutator may be easily removed without disturbing the brushes; tenth, to provide a vehicle wheel of this class from which the outer housing member, the field core, the field core hub member, the brush supports and the brushes may be easily removed without disturbing the armature and commutator; eleventh, to provide a vehicle wheel of this class in which the commutator and brushes are positioned at the back side so that the same cannot be readily interfered with from the front side of the wheel; twelfth, to provide a housing for a wheel of this class whereby the brushes at the back side of the wheel are readily accessible for repairs and renewals by removing only a small plate or cover in the inner housing of the wheel; thirteenth, to provide a vehicle wheel of this class in which the brushes are mounted on a support rotatably adjustable on a stationary support on which the wheel is mounted; fourteenth, to provide a wheel of this class in which the commutator is mounted against the inner side of a supporting surface extending transversely with the axis of rotation of the wheel and positioned inwardly from the armature and to the side thereof and secured in position by dovetail groove means formed by a commutator carrying ring and a plurality of segmental or sectional ring members forming the supporting surface; fifteenth, to provide an armature core of relatively small depth radially so as to reduce the diameter of the wheel to limits as small as possible and to provide an armature having laminated metal core sections secured to the opposite sides of an annular plate for readily and securely mounting the armature within the housing of the wheel; sixteenth, to provide simple and novel means for confining the lubrication of the wheel to the wearing parts only and to exclude the same from the motor mechanism; seventeenth, to provide a wheel of this class in which only two bearings are employed and such bearings of small diameter to reduce friction to a minimum; eighteenth, to provide a wheel of this class in which the wearing parts are readily accessible for lubrication; nineteenth, to provide a vehicle wheel of this class in which the outer portion of the wheel, or tire rim carrier, or the tire, is positioned considerably to one side of the median line of the armature or motor so that the armature and housing enclosing and adjacent the armature may be efficiently cooled; twentieth, to provide a wheel of this class in which the tire rim carrier is positioned a considerable distance outwardly from the armature so as to provide a circulating air space within the motor and to facilitate the conduction of heat to the exposed metal surfaces and therefore facilitate the radiation of the motor parts and motor housing to the atmosphere; twenty-first, to provide as a whole a novelly constructed, electrically driven vehicle wheel, and twenty-second, to provide a wheel of this class which is simple and economical of construction proportionate to its functions, durable, highly efficient and which will not readily deteriorate or get out of order.

Figure 3:
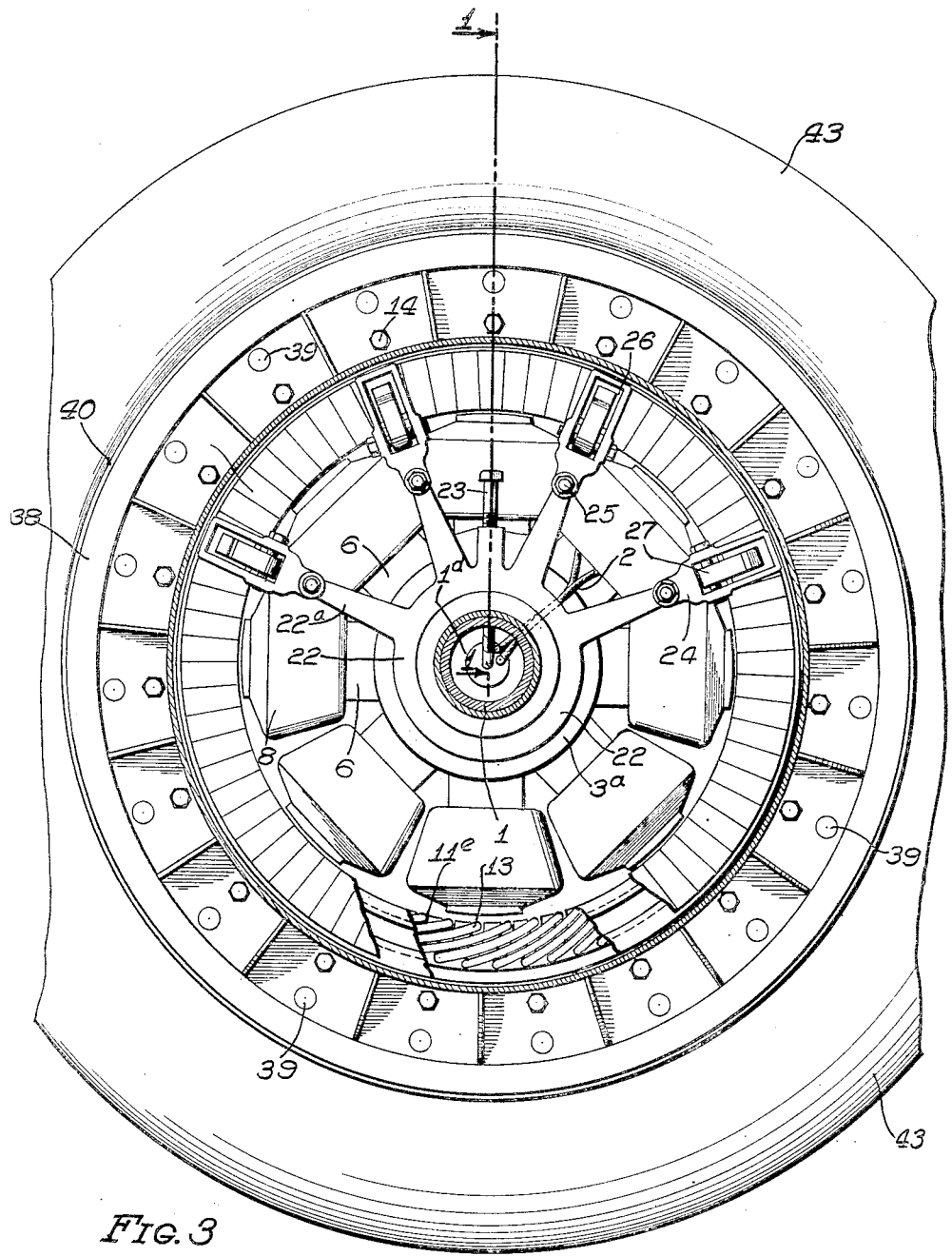

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a partial sectional and partial elevational view, taken from the side or edge of my vehicle wheel structure in its preferred form, the section being taken through 1—1 of Fig. 3, certain parts and portions of the portion in section being shown in elevation to facilitate the illustration and other parts being shown on a section line in front of the section indicated; Fig. 2 is a fragmentary elevational view, taken from the inner side or inner end of the wheel, and Fig. 3 is a fragmentary partial sectional and partial elevational view thereof, taken at 3—3 of Fig. 1.

Like characters of reference refer to similar parts and portions throughout the several views of the drawings.

The wheel, illustrated in the drawings, is typical of the incorporation of wheels for the rear axles of automobiles or other vehicles, or to such wheels which are not pivoted about vertical axes. However, the general principles of my wheel structure may also be adapted to front wheel mechanisms, or such wheels as are pivoted on vertical axes for steering purposes.

The axle, indicated by 1 in the drawings, is hollow or tubular and preferably of relatively large diameter. Said axle takes the place of the conventional axle housing for supporting the vehicle on the wheels or the wheels on the vehicle, and also serves as a casing or conduit for enclosing and protecting the electrical conductors 2 from the source of energy of the vehicle to the motor within the rear wheel, as will be described later. The outer end of the axle 1 is reduced in diameter, said portion being indicated by $1^a$. The reduced portion $1^a$ merges with the larger inner portion, preferably by means of an inclined shoulder $1^b$.

On the larger portion of the axle, just inwardly from the inclined shoulder, is mounted the field core hub member 3, which is keyed and locked relative to the axle by means of a key 4 and screw 5, as shown best in Fig. 1. At the outer end of the hub member 3, which extends partially over the reduced portion $1^a$ of the axle, is mounted the field core 6, which consists of laminated iron plates $6^a$ and heavier gage end plates $6^b$ at the outer sides of the outer sides of the laminations. Said core is secured, by means of a plurality of bolts 7, to an annular flange $3^a$, extending outwardly from and positioned intermediate the ends of the hub member 3.

It will be noted that, although the core 6 is shown with a particular number of poles, the same may have any number of poles desired and the same may be of any type or shape; also an inter-pole type of core may be used. Around the poles are provided suitable coils or windings 8, as shown, said coils being preferably outwardly divergent for economy of space.

Positioned inwardly from the hub member 3 and mounted on the axle 1 is a ballbearing 9, the outer race of which is mounted within a recess $10^a$ at the hub portion of the inner end housing or combined housing and brake drum 10. Said brake drum is of bell-shape construction, having a wide flange $10^b$ at its outer portion for enclosing the rear or inner end portion of the motor and wheel. At the outer edge of said flange, that is, at the edge toward the outer side of the wheel, is provided a flange $10^c$ at right angles to its axis of revolution. The flange $10^c$ is reinforced with the adjacent portion of the flange $10^b$ at the outer side of the latter flange by means of a plurality of radially extending ribs $10^d$, as shown in Figs. 1 and 2.

The armature 11 is positioned outwardly from and contiguous to the core 6 of the motor. Said armature consists of an annular plate $11^a$, against the opposite sides and at the inner portion of which are positioned a plurality of laminated iron rings $11^b$. At the outer sides of the relatively outer laminations, or rings, are positioned the armature end rings $11^c$ and $11^d$. The central annular plate $11^a$, the iron laminations $11^b$ and the end rings $11^c$ and $11^d$ are secured relative to each other by a plurality of bolts 12, which extend parallel with the axis of revolution of the armature. The portions of the annular plate $11^a$, extending outwardly beyond the laminations $11^b$, provide securing means for supporting the armature against the inner side of the flange 10ᶜ, and are secured together by means of a plurality of bolts 14, the nuts for said bolts being preferably welded to the plate 11ᵃ and the bolts being extended into the same from the outer side of the flange 10ᶜ.

The plate 11ᵃ and the laminations 11ᵇ of the armature are provided at their inner edges with transverse perforations for receiving and supporting the armature coils or windings 13. It will be here noted that a considerable portion of the armature 11 is in direct physical contact with the outer portion of the drum 10, permitting the heat, or a considerable portion of the heat, from the armature, to be conducted to the drum and thence radiated to the atmosphere. If desired, and commensurate with efficiency, the drum 10 may be secured over a still larger portion of the armature than that shown.

At the outer side of the laminæ retaining ring 11ᵈ, relative to the wheel, is secured by means of the bolts or screws 12, the commutator carrying ring 15. Said ring is cut out to receive the portions of the winding 13 extending inwardly from the armature core relative to the wheel. The ring 15 also extends toward the axis of revolution at said portion of the winding to approximately the diameter of but slightly greater than the diameter of the field core, so that the armature and commutator carrying ring may be readily removed from the housing without interfering with the core. To the normally inner side of said ring, relative to the wheel, and to the peripheral portion of said ring, are secured, by means of a plurality of screws 20, a plurality of commutator retaining ring sections or segments 19. The radially inward portion of the carrying ring and said retaining sections or segments form with each other a continuous dovetail channel for receiving correspondingly shaped lug portions at the back sides of numerous commutator segments 17. The back or securing portions of the commutator segments are insulated from the adjacent faces of the commutator carrying ring and said commutator retaining segments by mica or other suitable insulating material 18. The face of the carrying ring 15 and retaining segments 19 are perpendicular to the axis of revolution of said members. Each of the numerous commutator segments 17 is electrically connected by means of the leads 21 to the corresponding armature coils 13.

Around the rear end of the hub member 3 is rotatably mounted the brush supporting spider 22, which is provided with a plurality of outwardly radiating arms. The annular or hub portion is fixed and may be adjusted relative to the hub member by means of an adjusting screw 23, extending through said annular portion and engaging said hub member. At the outer ends of the arms of the spider are adjustably mounted, by means of bolts 25, the brush holders or sockets 24, the latter being insulated from the former by suitable insulating spacers and washers. At the outer ends of the brush holders 24 are provided sockets 24ᵃ in which are loosely positioned the brushes 26. Said brushes are normally forced into engagement with the commutator by means of a spiral spring 27 mounted between the socket portions of said brushes and their supported ends. It will be here noted that, if desired, the brush holders 24 may be loosened relative to the spider 22, permitting the brush holders to be shifted inwardly and thus removed with the hub member and field core without removing the armature and commutator.

To facilitate access to the bolts 25, the brushes 26 and the spider fixing screw 23, there is provided in the inner wall of the drum 10, an opening 10ᵉ, over which is fitted a readily removable cover plate 28, which plate is secured to the drum by means of screws 29. On the axle 1 and between the reduced portion 1ᵃ thereof and the hub member 3, and against the inclined shoulder of the axle, is positioned a spacing ring. On the reduced portion of the axle are mounted a pair of roller bearings 32, the inner one of which is positioned against the spacing ring 31. The outer races of said roller bearings are mounted in a wheel disc support 33. Over the outer end of the axle 1 is secured a cap 34, which closes the end of the axle against grease and also retains the roller bearings, as well as the wheel disc support, in position on the axle. The member 33 is provided with an outwardly extending flange in which are fixedly mounted a plurality of bolts or studs 35, the inner ends of which bolts or studs are welded or otherwise fixed to the member 33, and the threaded portions of which extend outwardly, as shown best in Fig. 1. To the outer face or side of the wheel disc support 33 is mounted the inner or hub portion of the wheel disc, or outer end housing 34. At the outer side of the wheel disc and support 33, and on the bolts or studs 35, is mounted the hub member 36, which encloses the roller bearings and also the outer end of the axle. Over the outer end of the hub member may be secured a hub cap 37 of any suitable construction.

The outer end or peripheral portion of the wheel disc 34 is provided with a tire rim carrier 38, which extends inwardly from its outer face and engages the plate 11 and the flange 10ᶜ, to which it is secured by means of a plurality of bolts 39. The normally inner side of the tire rim carrier 38 is provided with an outwardly directed flange 38ᵃ, as in the conventional construction. On the tire rim carrier 38 and against the flange 38ᵃ is mounted the tire rim 40, of conventional construction. Said rim 40 is retained in position in the ordinary manner by means of retaining members 41 and bolts 42. The head ends of the bolts 42 are positioned at the inner portions of the carrier and between the same and the plate 11ª, as indicated by dotted lines in Fig. 1. On the tire rim 40 is mounted the conventional tire 43. The lubrication is prevented from entering the motor from the ball and roller bearings by means of suitable grease retainers. One of said grease retainers consists of a ring 46 of substantially angular cross-section, which is secured with its inwardly extending flange, by means of screws 47, to the inner end of the hub member 3. The other flange portion of the ring 46 extends toward the inner side of the wheel and is provided in its end with a groove in which is mounted a felt packing 48, which is guided in an annular groove at the inner side of the drum 10. The other grease retainer consists of an annular felt or other packing ring 50, positioned between the outer end of the hub member 3 and the inner face of a ring 49, secured to the peripheral portion of the inner end of the wheel disc support 33.

The outer side of the cylindrical portion of the combined housing member and brake drum, between the ribs 10ᵈ and the inner end thereof, serves as an external braking surface which is engageable by a brake band, indicated by 51 in Figs. 1 and 2.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a vehicle wheel of the class described, an axle, a field winding core securely mounted at one end thereof and provided with field windings at the outer portion thereof, a pair of end housings revolubly mounted on said axle at opposite sides of said core and connected together at their outer portions, an armature carried by said end housings at their outer connected portions contiguous to the outer portions of said field core, and a tire rim carrier mounted on one of said housings, said tire rim carrier being positioned considerably to one side of the transverse median line of said armature and a considerable distance outwardly therefrom providing air circulating space between said armature and said tire rim carrier.

2. In a vehicle wheel of the class described, a supporting axle, a field core mounted near the end of said axle, a wheel disc revolubly mounted on said axle at the outer side of said core, a combined brake drum and motor housing revolubly mounted on said axle at the opposite side of said core and connected with the outer portion of said wheel disc, an armature carried by said combined brake drum and motor housing and said wheel disc, a commutator carried by and within said combined brake drum and motor housing at the inner side of said armature, and a plurality of brushes carried by said axle within said combined brake drum and motor housing in engagement with said commutator.

3. In a vehicle wheel of the class described, a supporting means, a field core carried by said supporting means, a wheel disc revolubly mounted on said supporting means at the outer side of said field core, a housing member also revolubly mounted on said supporting means at the opposite side of said field core, a tire rim carrier supported at the outer portions of said wheel disc and said housing member, a tire carried by said tire rim carrier and positioned substantially flush with the front side of said wheel disc, the peripheral portion of said housing member extending axially beyond the inner margin of said tire rim carrier, and a brake means positioned around the peripheral portion of said housing member.

4. In a vehicle wheel of the class described, a supporting axle, a field core carried by said axle, housing members revolubly mounted on said axle, one at each side of said core, an armature carried by and within said housing members and positioned around said core, the housing member at the inner side of said core being substantially cylindrical in form and extending axially beyond the inner margin of the core, a commutator carried by said housing members at the inner side of said armature, and a plurality of brushes carried by said axle and positioned in engagement with said commutator.

5. In a vehicle wheel of the class described, a supporting axle, a field core carried by said axle, housing members revolubly mounted on said axle, one at each side of said core, an armature carried by and within said housing members and positioned around said core, the housing member at the inner side of said core being substantially cylindrical in form and extending axially beyond the inner margin of the core, a commutator carried by said housing members at the inner side of said armature, and a plurality of brushes carried by said axle and positioned in engagement with said commutator, the housing member at the inner side of said core being provided with means to permit access to the interior thereof and to said brushes without removing said housing member.

6. In a vehicle wheel of the class described, a supporting axle, a field core carried by said axle, housing members revolubly mounted on said axle, one at each side of said core, an armature carried by and within said housing members and positioned around said core, a commutator carried by said housing members at the inner side of said armature, a brush supporting spider revolubly adjustably mounted on said axle, means for retaining said spider in a certain adjusted position, brush supports carried by said spider and extending adjacent said commutator, and brushes mounted in said brush supports and in engagement with said commutator.

7. In a vehicle wheel of the class described, a supporting axle, a field core carried thereby, a housing member revolubly mounted on said axle at the inner side of said core and extending toward the same in the proximity of the peripheral portion thereof, an armature carried by the last mentioned extended portion of the latter and positioned contiguous to said core, another housing member positioned over the outer side of said core and detachably secured to said other housing member, and a tire rim carrier mounted at the peripheral portion of said second housing member and removable therewith from said first mentioned housing member.

8. In a vehicle wheel of the class described, a supporting axle, a field core carried thereby, a housing member revolubly mounted on said axle at the inner side of said core and extending toward the same in the proximity of the peripheral portion thereof, an armature carried by the last mentioned extended portion of the latter and positioned contiguous to said core, bearing means mounted at the outer end of said axle, a housing member readily removably secured to said bearing means and to the outer portion of said first mentioned housing member, and a tire rim carrier positioned at the peripheral portion of said second housing member and adapted to be removed therewith from said first mentioned housing member.

9. In a vehicle wheel of the class described, a supporting axle, a field core carried thereby, a housing member revolubly mounted on said axle at the inner side of said core and extending toward the same in the proximity of the peripheral portion thereof, an armature carried by the last mentioned extended portion of the latter and positioned contiguous to said core, bearing means mounted at the outer end of said axle, a housing member readily removably secured to said bearing means and to the outer portion of said first mentioned housing member, and a hub member secured to the outer side of said second housing member by unitary means with said bearing means, said hub member being removable to permit access to said bearing means without removing said second housing member.

10. In a vehicle wheel of the class described, a hollow axle, a field core carried thereby near its outer end, a cap secured over the outer end of said axle, electric conductors extending through said axle to said core, a housing revolubly mounted on said axle around said core, and an armature carried by said housing contiguous to said core.

11. In a vehicle wheel of the class described, a hollow axle, a field core carried thereby near its outer end, a cap secured over the outer end of said axle, electric conductors extending through said axle to said core, a housing member revolubly mounted on said axle at the inner side of said core, a bearing mounted on the outer end of said axle and retained in position by said cap, a second housing member secured to said bearing and to the outer end of said first mentioned housing member, and an armature carried by said housing members contiguous to said core.

12. In a vehicle wheel of the class described, an axle, a field core carried by said axle, a housing member revolubly mounted on said axle at the inner side of said core, a brush support carried by said axle within said housing and between said core and said housing, brushes carried by said brush supports, an armature secured to the outer portion of said housing, and a commutator separately carried by said armature and adapted to be engaged by said brushes, said armature and said commutator being adapted to be removed from said housing without disturbing said core and said brushes.

13. In a vehicle wheel of the class described, an axle, a field core carried by said axle and in overhanging relation with the outer end thereof, a bearing means mounted on said axle outwardly from the mounting of said core and toward the central portion thereof, a housing member carried by said bearing means at the outer side of said core, an armature positioned inwardly from said housing member and contiguous to said core, a hub member positioned outwardly from said bearing means and carried thereby, said hub member being separated from said axle, and unitary means securing said housing member and said hub member to said bearing means.

14. In a vehicle wheel of the class described, a stationary field core, a housing revolubly mounted around said core, and a substantially annular armature having a radially outwardly extending flange at its median line secured to said housing.

15. In a vehicle wheel of the class described, a stationary field core, a housing revolubly mounted around said core, and an armature of substantially annular form having an outwardly extending flange at substantially its median line, said flange being removably secured to the interior margin of said housing.

16. In a vehicle wheel of the class described, a stationary field core, a housing revolubly mounted around said core, and an armature comprising a substantially annularly shaped armature securing plate and perforated laminated metal core sections secured to the inner portion of the opposite sides of said plate, the outer portions of said plate being secured to the interior of said housing.

17. In a vehicle wheel of the class described, a stationary field core, a housing member revolubly mounted at one side of said core and extending toward the same beyond the peripheral portions thereof, said housing member being provided at said last mentioned extended portion with an outwardly directed flange, and an armature comprising a substantially annularly shaped armature supporting plate and perforated laminated metal core sections secured to the opposite sides of the inner portion of said plate, the portion of said plate extending beyond said armature being secured to the flange of said housing member.

18. In a vehicle wheel of the class described, a stationary field core, a drum revolubly mounted at one side and partially over the peripheral portion of said core, the inner end of said drum being provided with an outwardly directed flange, reinforcing ribs at the outer side of said drum connecting said flange with the cylindrical portion of said drum, and an armature carried by the flange of said drum.

19. In a vehicle wheel of the class described, a non-revoluble hollow axle, a field core hub member mounted on said axle inwardly of the outer end thereof, bearing means mounted on said axle at the inner end of said hub member, a housing member carried by said bearing means, another bearing means mounted on said axle outwardly from said hub member, means for retaining said second bearing means in position on said axle, a second housing member secured to said second bearing means, a field core carried by said hub member, an armature carried by said housing members contiguous to said field core, and means between said hub member and said first housing member and said second bearing means and said hub member to confine the lubrication of said wheel to said bearing means.

20. In a vehicle of the class described, an axle, a field core mounted thereon and keyed thereto, a field core mounted at the outer end of said hub member, a spider mounted on the inner end of said hub member, a plurality of brush holders pivotally mounted on said spider, brushes mounted in said brush holders, a housing member revolubly mounted on said axle at the inner side of said field core and extending toward the outer end of said wheel, an armature core carried by said housing around said field core, a commutator positioned within said housing and at the inner side of said armature core and in engagement with said brushes, and a second housing revolubly mounted at the outer end of said axle and at the outer side of said field core and secured at its outer portion to the outer portion of said first housing, said second housing, said hub member, said spider, said brush holders and said brushes being removable from said wheel without removing said armature core and said commutator.

In testimony whereof, I have hereunto set my hand at San Diego, California, this 21st day of October, 1926.

EATHELBERT W. WEATHERS.